United States Patent [19]

Chiu

[11] 4,433,120

[45] Feb. 21, 1984

[54] LIQUID PHENOLIC RESIN COMPOSITION AND METHOD FOR WAFERBOARD MANUFACTURE

[75] Inventor: Shui-Tung Chiu, New Westminster, Canada

[73] Assignee: The Borden Chemical Company (Canada) Limited, Toronto, Canada

[21] Appl. No.: 307,180

[22] Filed: Sep. 30, 1981

[51] Int. Cl.³ .................................. C08L 61/10
[52] U.S. Cl. .................................. 525/501; 156/335; 427/339; 427/340; 427/342; 427/393; 427/395
[58] Field of Search .............. 528/140, 139, 165; 525/501

[56] References Cited

U.S. PATENT DOCUMENTS

| | | | |
|---|---|---|---|
| 2,620,288 | 12/1952 | Schrader et al. | 525/501 |
| 2,631,097 | 3/1953 | Redfern | 524/35 X |
| 3,180,784 | 4/1965 | Meiler | 428/528 |
| 3,267,188 | 8/1966 | Bassett et al. | 264/122 |
| 3,342,776 | 9/1967 | Lambuth | 528/140 X |
| 3,591,535 | 7/1971 | Jarvi | 525/501 X |
| 3,839,251 | 10/1974 | Bornstein | 528/165 X |
| 3,927,104 | 12/1975 | Miller et al. | 260/584 B |
| 3,927,140 | 12/1975 | Rice et al. | 525/501 X |
| 4,098,770 | 7/1978 | Berchem et al. | 528/140 X |
| 4,269,949 | 5/1981 | Hickson et al. | 528/144 X |
| 4,345,054 | 8/1982 | Takeda et al. | 528/139 X |

*Primary Examiner*—Howard E. Schain
*Attorney, Agent, or Firm*—George P. Maskas; Van Wyck, Kenneth P.

[57] ABSTRACT

A pre-cure resistant liquid phenol-formaldehyde resin binder composition having low viscosity and low surface tension for efficient spray application as fine droplets in waferboard manufacture comprising a highly condensed and cross-linkable phenol-formaldehyde resin of relatively high average molecular weight and a non-resinous methylolated phenol condensate having an average molecular weight of 200–300.

15 Claims, No Drawings

LIQUID PHENOLIC RESIN COMPOSITION AND METHOD FOR WAFERBOARD MANUFACTURE

BACKGROUND OF THE INVENTION

This invention relates to a pre-cure resistant liquid phenol-aldehyde condensation resin which are useful as adhesive and binders in waferboard manufacture.

In the present manufacture of waferboard, green wood wafers, which have been dried to 3-6% moisture content, are sprayed with molten wax, about 2%, based on dry wood weight; and powdered phenolic resin of 2-3 wt. percent is blown into a rotating blender. The resulting wax and resin-coated wafers are felted on a warm caul plate which is recycled through a hot-press. In mill practice, the warm caul plates are used directly without cooling, a recycle temperature of about 70°-110° C. The resulting loosely formed wafer mats are then hot-pressed to consolidate the board and cure the powdered resin binder. The maximum pressure of the hot press is about 450-500 pounds per square inch (31.5-35 kg/cm$^2$) and the hot press closing time is usually 1-2 minutes, depending upon board thickness desired, due to the high rigidity of the dry wood wafer mat. The surface of the mats are subjected to high temperature, i.e., 190°-210° C., during the loading and hot-press closing stage.

Powdered phenolic resins such as novolac, resole or combinations thereof, are generally used in present waferboard manufacture since they easily blend into the wafers for uniform resin distribution and they are pre-cure resistant and long storage life. U.S. Pat. No. 4,098,770 discloses a typical spray-dried powdered phenol-formaldehyde resin, modified with added non-phenolic polyhydroxy compound, which is used for waferboard manufacture. On the other hand, powdered resin has the disadvantage of being (1) expensive to produce, (2) requires a high wax content (about 2%) to improve affinity of resin powder on the wafer surface and (3) contribution to mill dust which in turn causes air pollution and health and safety, e.g., explosive hazard.

Liquid phenolic resins have been used in particleboard and plywood manufacture, but this application to waferboard, by an airless spray system, has been found to be ineffective due to problems of pre-cure and large resin droplet size. Pre-cure occurs before the waferboard is completely solidified, so that board surface layers are considerably weak. The geometrical shape of wood wafer also does not allow transfer from resin-excessive wafers to resin-deficient wafer by the rubbing effect used with wood particle.

An efficient waferboard liquid resin must therefore be pre-cure resistant and be able to be atomized in fine droplets to maximize wafer surface coverage. Thus, low viscosity and low surface tension are essential properties of the waferboard resin.

U.S. Pat. No. 3,267,188 disclosed a process for forming a composite board using post heat treatment to completely cure a binary resin binder consisting of a green phenolic resin and an advanced phenolic resin. The green phenolic resin is used to impregnate the wet wood particles and the high molecular resin is retained on the wood particle surface to serve as a binder after the resin treated wood is oven dried. The dissimilar character and geometrical shape of dry wood wafer precludes the disclosed impregnation of a green phenolic resin and does not suggest application by spraying in fine droplets on a dry wood wafer.

Other aqueous alkaline phenol-formaldehyde resins have been proposed as adhesive formulations for plywood and hardboard, such as that disclosed in U.S. Pat. No. 3,342,776, wherein a highly methylolated phenol is first produced under conditions which "prevent the formation of condensation but reduces free-formaldehyde" level and then further reacts at reflux temperatures to produce a highly reactive resin which, still has a "low enough molecular weight to provide for penetration of the wooden adherends". The resin, though of lower viscosity, lacks the pre-cure resistance necessary for waferboard application.

U.S. Pat. No. 3,591,535 discloses a liquid phenol-formaldehyde resin for hardboard which has a low molecular weight by combining a low viscosity resin with a resin which has been advanced to a high viscosity. This resin also lacks pre-cure resistance and has a viscosity which is still too high, i.e., 600-800 cps at 70°F. to be suitable for waferboard application. U.S. Pat. No. 3,839,251 also discloses a lower viscosity advanced phenolic resin for particleboard which is prepared by a two stage condensation reaction. The resin lacks pre-cure resistant properties and has a viscosity and surface tension considerably higher than that required for waferboard application.

U.S. Pat. No. 3,927,140 discloses an aldehyde condensation copolymer formed by co-condensing linear and non-crosslinkable aldehyde prepolymer with a highly thermosetable and cross-linkable prepolymer. Improved resin of flakeboard made from mixed hardwoods have been suggested by formulating phenolic resin with a second formaldehyde additive near the end of a conventional phenolic resin cook, as shown in *Formulation of An Economical Fast-Cure Phenolic Resin For Exterior Hardwood Flakeboards* by Chung-Yun Hse (Proceedings of Ninth Washington State University Symposium on Particleboard, April, 1975, Pullman, Washington).

These resins also do not contain significant amounts of non-resinous phenol-formaldehyde condensates to impart pre-cure resistant properties and have viscosity and surface tension significantly higher than that required for atomization on waferboard.

SUMMARY OF THE INVENTION

A pre-cure resistant, low viscosity and low surface tension liquid phenolic resin for waferboard manufacture comprising 20-80% of a highly condensed and cross-linkable phenol-aldehyde resin and 80-20% by weight of relatively low molecular weight non-resinous phenol-aldehyde condensates. The resin is prepared by reacting a first portion of phenol, aldehyde, e.g., formaldehyde and an alkaline catalyst at a temperature between 80° C. and reflux to produce a highly condensed, cross-linkage resin and then charging a second portion of phenol and aldehyde and alkaline catalyst and maintaining the temperatures at 45°-70° C. until the aldehyde is reacted to form non-resinous phenol-aldehyde condensates. The condensates portion consists mainly of mono-, di and tri-methylol phenols and the methylolated di and tri-nuclear phenols and has an average molecular weight of about 200-300.

It is the principal object of the invention to provide a pre-cure resistant liquid phenolic resin which will produce equal internal bond strength property of face and core in waferboard.

Another object of the invention is to provide a liquid phenol-aldehyde resin with low viscosity and low surface tension for maximizing coverage of wood wafers by spray atomization in waferboard production.

These and other objects of the invention as will become apparent from the following detailed description of the invention, have been achieved by providing a resin composition comprising 20–80% by weight of a high molecular weight highly condensed cross-linkable phenol-formaldehyde resin and 80–20% of a non-resinous phenol-formaldehyde condensate consisting essentially of low average molecular weight methylolated phenols.

DETAILED DESCRIPTION OF THE INVENTION

The novel liquid phenolic resin composition of this invention requires both a highly condensed and cross-linkable phenol-formaldehyde resin portion which has an average molecular weight of about 2000–6000 and which is present in the broad range of 20–80% by weight of the composition, and 80–20% by weight of a non-resinous phenol-formaldehyde condensate portion which comprises mono-, di and tri-methylol phenols and the methylolated di and tri-nuclear phenols. The average molecular weight (Mw) of the non-resinous portion is about 200–300. Neither non-resinous phenol-formaldehyde condensates nor highly condensed phenol-formaldehyde cross-linkable liquid resins alone can achieve the good quality bond of waferboard produced by using the novel liquid resin binder composition of this invention.

The desired molecular weight distribution of the waferboard liquid phenolic resin is produced by controlling the cooking temperature, time and steps of phenol and formladehyde addition in alkaline catalyzed phenol-aldehyde condensation reaction.

According to the general practice of this invention, the resin is prepared by charging a first portion of a phenol, formaldehyde and an alkaline catalyst and allowing the temperature to rise to between 80° C. and reflux. The resin is cooked to the extent required to produce a highly condensed phenol-formaldehyde resin. The second portion of phenol and formaldehyde and optional alkaline catalyst is then added. The reaction temperature is held at 45°–70° C. until the formaldehyde and phenol condensates are formed, mainly from the second portion of phenol and formaldehyde addition.

A very wide range of the resin molecular weight distribution is obtained from the resin cooking method. The poly-disperity, i.e., the ratio of weight average molecular weight (Mw) to number average molecular weight (Mn), is about 2.5 to 6.5 from the resin composition.

The liquid resin composition, thus produced, contains considerable amount of the low molecular weight non-resinous phenol-formaldehyde condensates. The resin composition therefore has a low overall viscosity and surface tension, which allows it to be atomized efficiently by conventional air and airless spray nozzles or centrifugal atomizers. The resulting very fine resin mist, in turn, allows maximum coverage of the treated wood wafer surface.

The non-resinous phenol-formaldehyde condensates and the highly condensed and cross-linkable resin exhibit different curing behavior during the process of curing phenol-formaldehyde resole in waferboard manufacture. The non-resinous phenol-formaldehyde condensates melt under the heat and pressure of curing and continues to wet the wood surface of the wafers. This results in over-penetration and long curing time. Use of the condensates alone would result in problems of under-cure and low bond strength. The highly condensed resins, on the other hand, become rubbery instead of melting, and thus gives poor wood surface wetting ability and rapid cure under heat. Use of the highly condensed resin, alone, therefore results in fast curing in the core and pre-cure on the face of the waferboard.

In accordance with the practice of this invention, when water in the highly condensed resin has been evaporated under heat and pressure during the curing process, the high molecular weight resin will swell in the presence of the non-resinous phenol-formaldehyde condensates. This mechanism can thus prevent over-penetration of the non-resinous molecule into the wood tissue, provide optimum resin flow for wetting wood surface and accommodate wood wafer movement during the hot-press closing stage. The resin is therefore pre-cure resistant for the waferboard face layers and fast-cure in the core of the board.

The resin of this invention is prepared generally, by condensation of a phenolic compound with an aldehyde in the presence of an alkaline catalyst. Though the invention is described in terms of phenol as the preferred phenolic compound, and formaldehyde and/or para-formaldehyde as the preferred aldehyde, other aldehyde or phenolic compounds may be used. Thus, part of the phenol may be substituted with resorcinol, xylenols, cresols or catechol. Similarly, aldehydes such as acetaldehyde and furfuraldehyde may be used. The preferred alkaline catalyst is sodium hydroxide, but other alkali metal hydroxides, carbonates, ammonium hydroxide and amines can be used as catalyst or co-catalyst with the sodium hydroxide.

The highly condensed and cross-linkable phenol-formaldehyde resin portion of the liquid resin composition is prepared by reacting the formaldehyde and phenol in a molar ratio within the range of 1–3:1 formaldehyde to phenol, with a molar ratio of 2.0–2.5:1 formaldehyde to phenol being preferred. The non-resinous phenol-formaldehyde condensates are prepared in a formaldehyde to phenol molar ratio range of 1.5 to 3.0:1, with molar ratio of 1.8 to 2.3:1 being preferred to minimize residual formaldehyde in the resin and obtain the desired rate of cure, the overall molar ratio of formaldehyde to phenol should be kept within the range of from 1.5 to 2.6:1, with a range of 1.7 to 2.4:1 being preferred.

The preferred molar ratio of sodium hydroxide catalyst to phenol for the overall resin reaction is 0.17 to 0.35:1. Depending on the resin storage life required, the range of sodium hydroxide can be increased to 0.1 to 0.6 mole per mole of phenol. This amount alkaline catalyst may be added all during the first stage, when the highly condensed resin portion is prepared, or it may be split into two additions.

The resin composition is prepared in an aqueous medium and has a resin solid content within the range of 35–70% with 50–60% being preferred. This resin solid content is dependent upon the ratio of highly condensed and cross-linkable resin to non-resinous condensates. Thus, to obtain a low viscosity resin, a resin which contains a high portion of highly condensed resin should have a low resin solid content. A high solid content and low viscosity resin can be obtained by increasing the amount of the non-resinous phenol-formaldehyde condensate relative to the amount of highly condensed and cross-linkable resin used in the final resin composition.

The resin composition of this invention is manufactured by a cooking method in which phenol and formaldehyde are preferrably divided into two desired portions. The first portion of phenol and formaldehyde is reacted in the presence of sodium hydroxide catalyst under high temperature to form the highly condensed and cross-linkable phenol-formaldehyde resin. Then the second portions of phenol, formaldehyde and/or sodium hydroxide are added and reacted at low temperature to form the non-resinous phenol-formaldehyde condensates.

Thus in the preferred method of manufacture, a highly condensed and cross-linkable phenol-formaldehyde resin is first prepared by charging a first portion of phenol, formaldehyde and sodium hydroxide and allowing the temperature to rise to between 80° C. and reflux. The resin is advanced to the average molecular weight (Mw) of 2,000 to 6,000 which is approximately equivalent to the viscosity of D to S on the Gardner-Holdt viscosity scale at 25° C. or 100 to 450 centipoises on a Brookfield viscosimeter Model RVF100 at 25° C. After the desired average molecular weight or resin viscosity is obtained, the temperature is reduced to 60°–70° C. and a second portion of phenol, formaldehyde and/or sodium hydroxide is added to the resin resulting from the first cook. The total resin containing composition is then cooked at 45°–70° C., preferably 55° to 65° C., until the residual formaldehyde content of the resin composition is 0 to 4%. The resin is then cooled to below room temperature.

In order to ensure complete methylolation of phenol with formaldehyde, the cooking time for this second portion of phenol and formaldehyde is usually about 60 to 180 minutes. The cooking time depends upon both the molar ratio of phenol to formaldehyde and sodium hydroxide and reaction temperature.

The resin residual formaldehyde content can be determined by the hydroxylamine hydrochloride method described at pp. 493–494 of J. F. Walker, *Formaldehyde*, Third Edition, Reinhold Publishing Corporation, N.Y., 1964.

The residual formaldehyde in the resin composition can be reduced by the optional addition of a formaldehyde scavenger at the end of the resin cook. Formaldehyde scavengers which have utility in the process of this invention include ammonium hydroxide, resorcinol, 3,5-xylenol, 3-cresol, urea and sulfites. Ammonium hydroxide is the preferred formaldehyde scavenger for use in the process of this invention.

The resin composition of this invention comprises 20–80% by weight of a highly condensed and cross-linkable phenol-formaldehyde resin and 80–20% by weight of non-resinous phenol-formaldehyde condensates. These proportions broadly define the resin compositions which will have utility over a range of anticipated waferboard manufacturing conditions and are not critical in and of themselves. The proportion of highly condensed resin and non-resinous methylolated phenol condensates used can be adjusted to suit the waferboard manufacturing conditions, which in turn depend upon press temperature, press closing time, press time and caul plate temperature during felting. High press temperature, slow closing of hot-press, i.e., low press pressure, and/or high caul plate temperature during felt requires a resin with a higher proportion of the non-resinous phenol-formaldehyde condensates than the highly condensed and cross-linkable phenol-formaldehyde resin. On the other hand, low press temperature, fast closing of hot-press, i.e., high press pressure and low caul plate temperature during felt requires a composition with a higher proportion of the highly condensed and cross-linkable phenol-formaldehyde resin than the non-resinous phenol-formaldehyde condensates.

A resin which consists of 40–60% of the highly condensed and cross-linkable phenol-formaldehyde resin and 60–40% of the non-resinous phenol-formaldehyde condensates has been found to be satisfactory for conventional waferboard manufacturing conditions, and is thus preferred. Conventional waferboard manufacturing conditions involve press temperatures of 190°–210° C., maximum press pressures of 450–500 psi (31.5–35.0 kg/cm$^2$) and caul plate temperatures during felt of below 120° C.

The following examples are provided as mere illustration of the novel resin composition and process of this invention, the invention is not to be considered as limited to the particular reactants, amounts or operating data given therein, since applicants intend that the invention cover all modifications and equivalent within the scope of the appended claims.

EXAMPLE 1

This example shows a normal-cook process of making pre-cure resistant waferboard liquid phenol-formaldehyde resin composition which comprises a highly condensed and cross-linkable phenol-formaldehyde resin and non-resinous phenol-formaldehyde condensates.

A reactor vessel was charged with the following ingredients:

| Ingredients | Parts By Weight | Molar Ratio |
|---|---|---|
| First Phenol (90% Concentration) | 15.65 | 1.00 |
| First Formaldehyde (46.5% Concentration) | 24.14 | 2.50 |
| First Water | 10.81 | |
| First Sodium Hydroxide (50% Concentration) | 4.17 | 0.35 |
| | (54.77) | |
| Second Phenol (90% Concentration) | 15.99 | 1.02 |
| Second Formaldehyde (46.5% Concentration) | 21.76 | 2.25 |
| Second Water | 1.76 | |
| Second Sodium Hydroxide (50% Concentration) | 3.83 | 0.32 |
| Ammonium Hydroxide (28–30% Concentration) | 1.89 | |
| | (45.23) | |

The reactor vessel was charged with first phenol, first formaldehyde and first water. Then the first sodium hydroxide was slowly added over a 10–15 minute period and the temperature was allowed to rise to 95° C. in 50 minutes. The resin was cooked at 95° C. to a Gardner-Holdt viscosity (25° C.) of AB, e.g., approximate 42 minutes at 95° C. and then cooled over approximately 9 minutes to 80° C. The temperature was held at 80° C. until the viscosity (25° C.) was KL. Ten (10) minutes after KL viscosity, the resin was cooled to 70° C. Second phenol, second formaldehyde and second water were then added to the resin. The temperature was adjusted to 65° C. and it was held at 65° C. until Gardner-Holdt viscosity (25° C.) was $A_1A$. Ten (10) minutes after $A_1A$ viscosity (25° C.), or 65 minutes after second phenol and formaldehyde were added, the resin was cooled to room temperature. When the temperature was cooled to 40°–30° C., second sodium hydroxide and ammonium hydroxide were added.

EXAMPLE 2

This example is a first-cook resin of a two-cook method in the Example 1. The resin contains only the highly condensed and cross-linkable phenol-formaldehyde resin. The resin formulation and cooking schedule are identical with the first-cook resin of Example 1.

| Ingredients | Parts By Weight | Molar Ratio |
|---|---|---|
| Phenol (90% Concentration) | 15.65 | 1.00 |
| Formaldehyde (46.5% Concentration) | 24.14 | 2.50 |
| Water | 10.81 | |
| First Sodium Hydroxide (50% Concentration) | 4.17 | 0.35 |
| Second Sodium Hydroxide (50% Concentration) | 0.31 | 0.03 |
| Ammonium Hydroxide (28–30% Concentration) | 0.94 | |

As described in Example 1, the reactor vessel was charged with phenol, formaldehyde and water. Then the first sodium hydroxide was slowly added over a 10–15 minute period and the temperature was allowed to rise to 95° C. in 50 minutes. The resin was cooked at 95° C. to a Gardner-Holdt viscosity (25° C.) of AB and then cooled to 80° C. The temperature was held at 80° C. until the viscosity (25° C.) was KL. Ten (10) minutes after KL viscosity, the resin was cooled to 65° C. and held for 65 minutes. The resin was then cooled to room temperature. When the temperature was cooled to 40°–30° C., the second sodium hydroxide and ammonium hydroxide were added slowly.

EXAMPLE 3

This example is equivalent to the second-cook resin of the Example 1. It contains only the non-resinous phenol-formaldehyde condensates. The formulation and cooking schedule are identical with the second-cook resin of Example 1.

| Ingredients | Parts By Weight | Molar Ratio |
|---|---|---|
| Phenol (90% Concentration) | 15.99 | 1.00 |
| Formaldehyde (46.5% Concentration) | 21.76 | 2.20 |
| Water | 1.72 | |
| First Sodium Hydroxide (50% Concentration) | 2.10 | 0.17 |
| Second Sodium Hydroxide (50% Concentration) | 1.42 | 0.12 |
| Ammonium Hydroxide (28–30% Concentration) | 0.94 | |

The reactor vessel was charged with phenol, formaldehyde and water. The first sodium hydroxide was then added slowly over a 10-minute period. In the meantime, the temperature was allowed to rise to 65° C. in 10 minutes. The temperature was held at 65° C. for 65 minutes. The phenol-formaldehyde condensates were then cooled to room temperature. The second sodium hydroxide and ammonium hydroxide were added when the temperature was cooled to 40°–30° C.

RESIN ANALYSIS OF EXAMPLES 1–3

The resins of Examples 1 to 3 were analyzed for Gardner-Holdt viscosity (25° C.), refractive index (25° C.), sodium hydroxide content, non-volatile content and resin molecular weight distribution by high pressure gel permeation chromatograph. The resin weight average molecular weight (Mw) and number average molecular weight (Mn) were calculated from gel permeation chromatograms.

The high pressure of gel permeation chromatograph was a Waters Association Model ALC/GPC-201 equipped with a series of different pore size gel permeation columns. The column combination used for this analysis was $10^4$, $10^3$, 500 and 100 Å $\mu$-styragel.

Resin samples for gel permeation chromatograph were prepared according to the following procedure:

(1) A liquid resin sample of about 0.30–0.35 grams was dissolved into 10 grams of tetrahydrofuran solvent.
(2) The pH of the resin solution was adjusted to pH 4.0±0.2 with one normal sulfuric acid solution.
(3) The resin solution was then dehydrated by adding 10 grams of sodium sulfate.
(4) The resin solution was filtered using a sample clarification kit.
(5) About 200 $\mu$l of the resin solution was injected into the chromatograph.

The high pressure gel permeation chromatograph was operated under the following conditions:
Solvent: Tetrahydrofuran
Temperature: 25° C.
Detector: Refractive Index, 8X
Flow Rate: 1.0 ml/minute The results of the gel permeation chromatograms of the resin made in Examples 1 to 3 are shown in Table 1.

As discussed previously, a desired molecular weight distribution of the waferboard liquid resin can be made by controlling temperature, cooking time, and the steps of phenol and formaldehyde addition. The origin of the molecular weight distribution of the Example 1 resin was demonstrated by separating the normal cooking method into two cooks (Examples 2 and 3). It is readily seen that the non-resinous phenol-formaldehyde condensate (low molecular weight portion) of the resin result primarily from the second cook (Example 3) analogous to the second addition of phenol and formaldehyde in the normal method (Example 1); while the high molecular weight portion results from the first cook (Example 2)—analogous to the first charge of phenol and formaldehyde in the normal cook (Example 1). Only a small amount of overlap exists in the 400–700 molecular weight range.

Table 1 shows the results of resin analyses including the weight average molecular weight (Mw) and number average molecular weight (Mn) calculated from the gel permeation chromatogram.

The resin characteristics (viscosity, surface tension, refractive index, sodium hydroxide content and non-volatile content) of the physical mixture of Example 2 and Example 3 at a 56 to 44 weight ratio showed very close to the Example 1 resin.

TABLE 1
SUMMARY OF RESIN ANALYSIS

| | Example 1 | Example 2 | Example 3 | Example 2 Example 3 56/44 by Wt. Mix |
|---|---|---|---|---|
| Viscosity (25° C.) Gardner-Holdt | AB | XX-Y | A2-A1 | AB |
| Surface Tension* (25° C.) dynes/cm | 56.5 | 71.5 | 54.0 | 59.0 |
| Refractive Index (25° C.) | 1.4660 | 1.4543 | 1.4758 | 1.4650 |
| Sodium Hydroxide Content, % | 4.14 | 4.18 | 4.40 | 4.28 |
| Non-volatile | 45.38 | 40.83 | 49.99 | 44.86 |

TABLE 1-continued

SUMMARY OF RESIN ANALYSIS

| | Example 1 | Example 2 | Example 3 | Example 2 Example 3 56/44 by Wt. Mix |
|---|---|---|---|---|
| Content, % | | | | |
| Non-volatile Phenol-Formaldehyde Content, % | 41.24 | 36.65 | 45.59 | 40.58 |
| $\overline{M}w$ | 2410 | 4121 | 264 | — |
| $\overline{M}n$ | 381 | 1314 | 175 | — |
| $\overline{M}w/\overline{M}n$ | 6.33 | 3.14 | 11.51 | — |

*Determined by Fisher Model 215 Surface Tension Analyzer. Elevator speed of ring was 0.05 in/minute.

In summary, Examples 1 to 3 demonstrate that the resin which consists of the highly condensed and cross-linkable resin and the non-resinous phenol-formaldehyde condensates can be made by controlling cooking temperature, cooking time and the steps of phenol and formaldehyde addition.

EVALUATION OF RESINS PREPARED FROM EXAMPLES 1 TO 3

The resins prepared in Examples 1 to 3 were evaluated by making waferboard and testing for internal bond and the accelerated aging modulus of rupture (MOR). The Canadian Standard Association (CSA) Standard CAN3-0188.0-M78 was followed.

Laboratory size (10×10×½ inch) boards were made according to the conventional waferboard mill conditions. Thus a commercial aspen wood waferboard furnish with 4.5% moisture content was sprayed with 2% resin (non-volatile phenol-formaldehyde) based on dry wood weight. A laboratory type air-sprayer and blender were used for the liquid resin application.

The resin sprayed wood furnish was formed into a mat and pre-pressed in a cold press. In simulating the waferboard mill conditions, the mat was topped with a ⅛ inch thick stainless steel caul plate which was pre-heated to 93° C. To ensure good contact between hot caul and the mat, a weight to give a 0.1 psi was placed on the hot caul. The hot caul on the mat was allowed to stand for 10 minutes prior to hot-pressing. The half inch thick waferboard was then made by hot-pressing at 200° C. press temperature for 6 minutes with maximum pressure of 450 psi. The average specific gravity of the board was 0.65.

Three (3) boards were made for each resin prepared in Examples 1, 2, 3 and the physical blend of Examples 2 and 3 at 56/44 ratio by weight. Six (6) internal bond samples were prepared from each board, and tested according to CSA Standard CAN3-0188.0-M78. The rate of face failure (%) was determined from the ratio of the number of face failure (breaks) samples to the total internal bond tested specimens. The results are summarized in Table 2.

TABLE 2

| Resin | Internal Bond psi | n | SD | Face Failure % |
|---|---|---|---|---|
| Example 1 | 64.5 | 18 | 11.5 | 66.7 |
| Example 2 | 30.7 | 18 | 10.5 | 100 |
| Example 3 | 24.4 | 18 | 7.7 | 0 |
| Mixture* of Examples 2 and 3 | 59.1 | 18 | 10.6 | 66.7 |

*The resin was prepared by mixing Example 2 and Example 3 resins at a 56/44 ratio by weight.
n = number of specimens
SD = standard deviation
Face Failure, % = the ratio of the face failure specimen to the total internal bond tested specimen.

The following findings were made from the results shown in Table 2:

(1) The highly condensed and cross-linkable resin, as prepared in Example 2, showed low internal bond strength, and all the tested internal bond samples failed on face layers of the waferboard. This indicates the pre-cure of the resin.

(2) The non-resinous phenol-formaldehyde condensates as prepared in Example 2, also produced very poor internal bond strength, and all the internal bond samples failed in the core layer of the waferboard. This indicates the under-cure of the binder.

(3) The resins which consisted of the highly condensed and cross-linkable phenol-formaldehyde resin and the non-resinous phenol-formaldehyde condensates, as prepared in Example 1 as well as the physical blend of Examples 2 and 3 at a 56/44 ratio by weight, produced very high internal bond strength waferboard. The rates of the face failure are 66.7% for both Example 1 resin and the resin of the physical blend of Examples 2 and 3.

Furthermore, in order to simulate the various caul plate conditions in the commercial waferboard production line, a wide range of the caul plate temperatures (25° C. to 149° C.) were tested for the invented resin prepared in Example 1. For comparing with the Example 1 resin, one commercial particleboard resin (W135) and plywood resin (W838LV) of Borden Chemical Western were also tested.

As in the previously described procedure, laboratory size (10×10×½ inch) waferboards were made. Therefore, a commercial aspen wood waferboard furnish with 4.5% moisture content was sprayed with 2% resin (non-volatile phenol-formaldehyde resin) based on dry wood weight.

The resin sprayed furnish was formed into a mat and pre-pressed in a cold press. Five (5) ⅛ inch thick stainless steel caul plates were preheated to 80° C., 93° C., 121° C., 135° C. and 149° C. respectively and the pre-pressed mat was topped with the hot caul. To ensure good contact between hot caul plate and mat, a weight to give 0.1 psi was placed on the hot caul. Again, the hot caul on the mat was allowed to stand for 10 minutes to simulate mill conditions. A cold (25° C.) caul plate on a mat was used for a control. Then the waferboards were made by hot-pressing at 200° C. for 6 minutes with maximum pressure of 450 psi for half inch thick board. Under the same pressing condition, waferboards were also made with W135 and W838LV of Borden Chemical Western, with a cold (25° C.) caul plate on the mat for 10 minutes before hot-pressing. The specific gravity of the waferboards was 0.65±0.02.

The waferboards were tested for internal bond and accelerated aging modulus of rupture according to the aforementioned CSA standard. The results are shown in Table 3.

TABLE 3

| Caul Temperature, °C. | 25 | 80 | 93 | 121 | 135 | 149 |
|---|---|---|---|---|---|---|
| EXAMPLE 1 RESIN | | | | | | |
| Internal Bond[a], psi | 63.9 | 68.8 | 63.9 | 74.2 | 44.0 | 39.8 |
| Standard Deviation | 9.7 | 12.9 | 13.4 | 12.0 | 10.9 | 12.0 |
| Face Failure[b], % | 0 | 33 | 22 | 33 | 89 | 100 |
| Accelerated Aging MOR[c], psi | 1332 | 1539 | 1215 | 1359 | — | — |
| COMMERCIAL PARTICLEBOARD RESIN (BORDEN W135) | | | | | | |
| Internal Bond[d], psi | 42.3 | | | | | |
| Face Failure, % | 100 | | | | | |
| COMMERCIAL PLYWOOD RESIN (BORDEN W838LV) | | | | | | |
| Internal Bond[d], psi | 36.0 | | | | | |
| Face Failure, % | 100 | | | | | |

[a]Average of 9 specimens.
[b]The ratio of the face failure specimen to the total internal bond tested specimen.
[c]Two-hour boil modulus of rupture according to CSA standard CAN3-0188.0-M78.
[d]Average of 6 specimens.

By evaluating the internal bond and the rate of face failure shown in Table 3, the invented waferboard resin prepared in Example 1 was significantly better in pre-cure resistance than the commercial particleboard resin (W135) and plywood resin (W838LV). The invented resin prepared in Example 1 could endure up to a 120° C. caul plate temperature, whereas the commercial particleboard resin and plywood resin showed pre-cure even at 25° C. caul plate temperature. In addition, the accelerated aging modulus of rupture results in Table 3 showed the invented Example 1 resin passed the CSA standard.

Moreover, reducing the press time for manufacturing waferboard is vitally important in order to achieve high productivity. Therefore, the curing rate of the invented resin (Example 1) was examined by comparing it with a commercial novolac type powdered phenolic resin which was being used in a waferboard production line.

As in the previously described procedure, laboratory size (10×10×½ inch) waferboards were made with different press times at constant press temperature. The cure of the resin was evaluated from the internal bond strength and the accelerated aging modulus of rupture.

A commercial aspen waferboard furnish with 4.0% moisture content was sprayed with the invented resin to a 2% resin solids level (non-volatile phenol-formaldehyde resin) based on the dry wood weight. For powder resin, the aspen wafer was first sprayed with 2% molten wax and then blended with 2% powder resin based on dry wood weight.

In order to simulate waferboard mill conditions, the pre-pressed mats were topped with a ⅛ inch thick stainless steel hot caul plate at 93° C. initial temperature for 10 minutes prior to hot-pressing. Again, to ensure good contact of the mat and hot caul, a weight to give 0.1 psi to the mat, was placed in the hot caul. The half inch thick waferboards were made by the following conditions:
 Press Temperature: 210° C.
 Maximum Press Pressure: 450 psi.
 Press Time: 4.5, 5.0, 5.5, 6.0 and 7.0 minutes Three boards were made for each pressing condition. The average board's specific gravity was 0.65.

The effect of press time on the internal bond strength and the accelerated aging modulus of rupture (MOR) of the waferboards is shown in Table 4.

TABLE 4

| Press Time, Min. | 4.5 | 5.0 | 5.5 | 6.0 | 7.0 |
|---|---|---|---|---|---|
| EXAMPLE 1 | | | | | |
| Internal Bond*, psi | 61.2 | 65.4 | 57.3 | 64.1 | — |
| Standard Deviation | 12.8 | 13.1 | 11.4 | 11.0 | — |
| Face Failure, % | 16.7 | 16.7 | 72.2 | 55.0 | — |
| Accelerated Aging MOR**, psi | 1278 | 1452 | 1704 | 1614 | — |
| COMMERCIAL NOVOLAC-TYPE POWDER RESIN | | | | | |
| Internal Bond*, psi | — | 18.6 | 28.7 | 34.2 | 56.0 |
| Standard Deviation | — | 4.5 | 5.5 | 5.0 | — |
| Face Failure, % | — | 0 | 0 | 0 | 0 |
| Accelerated Aging MOR**, psi | — | Delam. | Delam. | 1000 | 1179 |

*Average of 18 specimens
**Average of 3 specimens
Face Failure, % = The ratio of the face failure specimens to the total internal bond tested specimens.

The results shown in Table 4 indicate that the invented liquid resin (Example 1) cured considerably faster than the commercial powder resin. To cure the resin, the press time for 0.5 inch thick waferboard can be only 4.5 minutes for the invented resin; whereas, for the powder resin, the press time has to extend to more than 6.0 minutes. Therefore, according to the preceding investigations, the following conclusions were made:

(1) The commercial particleboard and plywood liquid phenolic resins showed pre-cure for waferboard manufacture.
(2) High quality waferboard can be manufactured with the liquid phenolic resins which consist of a misture of highly condensed and cross-linkable phenol-formaldehyde resin and non-resinous phenol-formaldehyde condensates.
(3) A method was invented for making a high efficiency liquid waferboard resin by controlling resin cooking temperature, time and the steps of phenol and formaldehyde addition as shown in Example 1.
(4) The invented resin (Example 1) is pre-cure resistant for waferboard surface and fast-cure in the core, and it satisfied the wide range of caul temperatures present in commercial waferboard production lines.

EXAMPLE 4

This example demonstrates the method of manufacturing the invented waferboard resin. The resin is evaluated for pre-cure resistance and curing reaction rate by making waferboard under simulated mill conditions.

A reactor vessel was charged with the following ingredients:

| Ingredients | Parts By Weight | Molar Ratio |
|---|---|---|
| First Phenol (90% Concentration) | 15.97 | 1.00 |
| First Formaldehyde (46.5% Concentration) | 24.64 | 2.50 |
| First Water | 11.02 | |
| First Sodium Hydroxide (50% Concentration) | 4.26 | 0.35 |
| | (55.89) | |
| Second Phenol (90% Concentration) | 16.33 | 1.02 |
| Second Formaldehyde (46.5% Concentration) | 22.21 | 2.25 |
| Second Water | 1.90 | |
| Second Sodium Hydroxide (50% Concentration) | 1.74 | 0.02 |
| Ammonium Hydroxide (28–30% Concentration) | 1.93 | |
| | (44.11) | |

The resin manufacturing process is similar to Example 1. The reactor vessel was charged with first phenol, first formaldehyde and first water. The first sodium hydroxide solution was slowly added over a 10–15 minute period, and the temperature was allowed to rise to 95° C. in 50 minutes. The resin was advanced at 95° C. to a Gardner-Holdt viscosity (25° C.) of AB and then cooled to 80° C. The temperature was held at 80° C. until the resin viscosity (25° C.) was FG. The resin was cooled to 70° C. immediately. Second phenol, second formaldehyde and second water were then added to the resin. The temperature was adjusted to 65° C. and it was held at 65° C. for 100 minutes. The resin viscosity (25° C.) was $A_1A$, and the residual formaldehyde was 4%. The resin was cooled to room temperature. When the temperature was cooled to 40°–30° C., second sodium hydroxide and ammonium hydroxide were added slowly to the resin.

The results of the resin analysis are shown in Table 5:

TABLE 5

| | |
|---|---|
| Viscosity (25° C.) Gardner-Holdt | $A_1A$ |
| Surface Tension* (25° C.) dynes/cm | 57.0 |
| Non-Volatile Content, % | 46.0 |
| Sodium Hydroxide Content, % | 3.0 |
| Non-Volatile Phenol-Formaldehyde Content, % | 43.0 |

*Determined by Fisher Model 215 Surface Tension Analyzer. Elevator speed of ring was 0.05 in/minute.

As shown in Table 5, the resin is low viscosity and low surface tension. The resin can be efficiently atomized by using a conventional spray system.

The resin was evaluated for pre-cure resistance and the rate of curing reaction.

The previously described pre-cure resistant test method was followed. A commercial aspen waferboard furnish with 4.5% moisture content was sprayed with the resin prepared in Example 4. The resin add-on was 2% resin solids (non-volatile phenol-formaldehyde resin) based on dry wood weight. The resin sprayed furnish was formed into a mat and pre-pressed in a cold press. Three (3) ⅛ inch thick stainless steel plates were preheated to 93°, 121° and 135° C., and the pre-pressed mat was topped with the hot caul. To ensure good contact between hot caul plate and mat, a weight given 0.1 psi was placed on the hot caul. The hot caul on the mat was allowed to stand for 10 minutes before hot-pressing. A cold (25° C.) caul plate on a mat was used for a control. Three boards were made for each caul temperature pre-treatment.

The half inch thick waferboards were made by hot-pressing at 210° C. for 6 minutes with the maximum pressure of 450 psi.

The waferboards were tested for internal bond and the accelerated aging modulus of rupture (MOR) according to the aforementioned CSA standard. The results are shown in Table 6:

TABLE 6

| Caul Temperature, °C. | 25 | 93 | 121 | 135 |
|---|---|---|---|---|
| Internal Bond*, psi | 72.0 | 70.5 | 73.1 | 66.9 |
| Face Failure*, % | 0 | 55.6 | 50.0 | 88.9 |
| Accelerated Aging MOR**, psi | 1830 | 1854 | 1950 | 1944 |

*Average of 18 specimens
**Average of 3 specimens

The results shown in Table 6 indicate that the invented resin is pre-cure resistant, because the waferboard internal bond is not deteriorated with the initial caul temperature pre-treatment up to 120° C.

Furthermore, the effect of press time on waferboard properties was evaluated. As a previously described procedure, the aspen waferboard furnish with 4.0% moisture content was sprayed with 2% resin solids (non-volatile phenol-formaldehyde resin) based on dry wood weight. Again, in simulating mill conditions, the pre-pressed mat was topped with a ⅛ inch thick stainless steel caul plate with an initial temperature of 93° C. To ensure good contact between hot caul and mat, a weight was placed on the caul plate to give 0.1 psi on the mat. The hot caul on the mat was allowed to stand for 10 minutes before hot-pressing. The ½ inch thick waferboard was made under the following conditions:

Press Temperature: 210° C.
Maximum Press Pressure: 450 psi
Press Time: 4.5, 5.0, 5.5 and 6.0 minutes Three (3) boards were made for each pressing condition, and the average board's specific gravity was 0.65. The effect of press times on the waferboard internal bond and the accelerated aging modulus of rupture (MOR) is shown in Table 7.

TABLE 7

| Press Time, Minutes | 4.5 | 5.0 | 5.5 | 6.0 |
|---|---|---|---|---|
| Internal Bond*, psi | 57.9 | 62.6 | 62.4 | 66.4 |
| Standard Deviation | 8.2 | 12.2 | 10.8 | 11.6 |
| Face Failure, % | 0 | 17.6 | 22.2 | 16.7 |
| Accelerated Again MOR**, psi | 1332 | 1386 | 1626 | 1788 |

*Average of 18 specimens
**Average of 3 specimens
Face Failure = The ratio of the face failure specimens to the total internal bond tested specimens.

With 4.5 minutes press time for ½ inch thick waferboards, the internal bond strength and the accelerated aging modulus of rupture are acceptable by the Canadian Standard Association (CSA) Standard CAN-0188.2-M78.

In summary, the example demonstrates that the resin made by the invented process has low viscosity and low surface tension. When it is used for waferboard manufacture, the resin is pre-cure resistant on face layers and fast cure in the core of waferboard.

EXAMPLE 5

This example also demonstrates the method of manufacturing the invented resin. The resin is evaluated for pre-cure resistant property for waferboard manufacture.

A reactor vessel was charged with the following ingredients:

| Ingredients | Parts By Weight | Molar Ratio |
|---|---|---|
| First Phenol (90% Concentration) | 16.54 | 1.00 |
| First Formaldehyde (46.5% Concentration) | 25.53 | 2.50 |
| First Water | 9.38 | |
| First Sodium Hydroxide (50% Concentration) | 4.42 (55.87) | 0.35 |
| Second Phenol (90% Concentration) | 18.66 | 1.13 |
| Second Formaldehyde (46.5% Concentration) | 23.41 | 2.29 |
| Second Water | 0.06 | |
| Second Sodium Hydroxide (50% Concentration) | 1.00 | 0.08 |
| Ammonium Hydroxide (28-30% Concentration) | 1.00 (44.13) | |

The reactor vessel was charged with first phenol, first formaldehyde and first water. The first sodium hydroxide was slowly added over a 10-15 minute period and the temperature was allowed to rise to 90° C. in 50 minutes. The temperature was held at 90° C. until the Gardner-Holdt viscosity (25° C.) of the resin was AB. Then the resin was cooled to 80° C. The resin was advanced at 80° C. until the Gardner-Holdt viscosity (25° C.) was D. The resin was cooled to 65° C. Second phenol, second formaldehyde and second water were then added to the cooked resin. The second sodium hydroxide was added slowly (approximately 10-20 minutes). The temperature was adjusted to 65° C. by cooling; it was held at 65° C. for 140 minutes. The residual formaldehyde of the resin was 1.8% and the resin viscosity (25° C.) was A of the Gardner-Holdt scale. The resin was then cooled to room temperature. When the temperature was cooled to 40°-30° C., ammonium hydroxide was added to the resin.

The results of the resin analysis are shown in Table 8:

TABLE 8

| | |
|---|---|
| Viscosity (25° C.) Gardner-Holdt | A |
| Surface Tension* (25° C.) dynes/cm | 59.0 |
| Sodium Hydroxide Content, % | 2.7 |
| Non-Volatile Content, % | 48.3 |
| Non-Volatile Phenol-Formaldehyde Content, % | 45.6 |

*Determined by Fisher Model 215 Surface Tension Analyzer. Elevator speed of ring was 0.05 in/minute.

The resin was evaluated for making waferboards with different moisture contents of aspen wood furnish.

The commercial aspen wafer samples of 3.0% and 4.7% moisture contents were sprayed with 2% resin solids (non-volatile phenol-formaldehyde) based on dry wood weight. The resin-sprayed wood wafers were formed into a mat and pre-pressed in a cold press.

The resin pre-cure resistance was tested by pre-heating three (3) ⅛ inch thick stainless steel caul plates to temperatures of 65°, 93°, and 120° C. The pre-pressed mats were then transferred onto the hot caul plates and allowed to stand for 10 minutes prior to hot-press into waferboard. A mat on a cold (25° C.) caul plate was used for control.

The ½ inch thick waferboard was made by hot-pressing at 210° C. for 6 minutes with a maximum pressure of 450 psi. The waferboard specific gravity and the effect of caul plate temperatures on board internal bond strength and the rate of face failure are shown in Table 9:

TABLE 9

| Caul Temperature, °C. | 25 | 65 | 93 | 121 |
|---|---|---|---|---|
| 3.0% MOISTURE CONTENT WOOD FURNISH | | | | |
| Board Specific Gravity | 0.62 | 0.64 | 0.63 | 0.63 |
| Internal Bond*, psi | 66.6 | 64.8 | 59.7 | 58.2 |
| Standard Deviation | 13.8 | 10.9 | 10.8 | 7.0 |
| Face Failure, % | 22.2 | 38.9 | 52.9 | 77.8 |
| 4.7% MOISTURE CONTENT WOOD FURNISH | | | | |
| Board Specific Gravity | 0.63 | 0.64 | 0.64 | 0.63 |
| Internal Bond*, psi | 62.2 | 67.3 | 54.2 | 55.4 |
| Standard Deviation | 7.9 | 8.9 | 8.2 | 12.2 |
| Face Failure, % | 11.8 | 17.7 | 55.6 | 55.8 |

*Average of 18 specimens
Face Failure, % = The ratio of the face failure specimens to the total internal bond tested specimens.

Although the rate of face failure increased as the caul plate temperature was increased, the invented resin was able to endure up to 121° C. initial caul temperature without substantial deterioration of internal bond strength.

Again, the example demonstrates that the invented resin has low viscosity and low surface tension, and the resin is pre-cure resistant for waferboard manufacture.

The novel pre-cure resistant, low viscosity and low surface tension phenolic resin composition of this invention has been found to give acceptable results in waferboard mill production, even when used in combination with minor proportions of the more expensive conventional powered resin binder. While it is not preferred, the use of minor proportions of powered resin with the novel liquid phenolic resin of this invention is within the scope of this invention and can be used by one skilled in the art to the extent that the inherent problems of powered resin can be tolerated in the manufacture of an acceptable waferboard product.

Applicant having described the invention, other modifications and improvements will be obvious to those skilled in the related waferboard resin arts. Applicant therefore desires to be limited only by the scope of the appended claims.

We claim:

1. A method of preparing a pre-cure resistant liquid phenolic resin binder composition having a viscosity and surface tension which is sufficiently low to allow spray application as fine droplets to waferboard comprising the steps of:
   (a) reacting phenol and formaldehyde in a formaldehyde to phenol molar ratio of 1:1 to 3:1 in a first stage in the presence of an alkaline catalyst at a temperature which is allowed to rise to between 80° C. and reflux to produce a highly-condensed and crosslinkage phenol-formaldehyde resin having an average molecular weight in the range of about 2000-6000 and a viscosity of 100-450 cps at 25° C.
   (b) reducing the temperature of the resulting resin to 60°-70° C.,
   (c) adding a second portion of phenol and formaldehyde in a phenol to formaldehyde mol ratio of 1.5:1 to 3:1 and alkaline catalyst to the resin and cooking at 45°-70° C. until the formaldehyde is reacted to a free formaldehyde content of 0-4% to produce a non-resinous phenol-formaldehyde condensate comprising methylated phenols having an average molecular weight of about 200-300; and
   (d) cooling the resulting liquid phenolic resin composition to a temperature below room temperature.

2. The method of claim 1 wherein the resulting liquid resin binder composition comprises 20-80% by weight of the highly condensed, high molecular weight resin and 80-20% by weight of the non-resinous condensate and the resulting overall formaldehyde to phenol molar ratio in the composition is within the range of 1.5:1 to 2.6:1.

3. The method of claim 2 wherein the non-resinous phenol-formaldehyde condensates consist essentially of mono, di, and tri-methylol phenols and methylolated di and tri-nuclear phenols.

4. The method claim 3 wherein the alkaline catalyst is sodium hydroxide and is present in a molar ratio to phenol of 0.1:1 to 0.6:1.

5. The method of claim 4 wherein the molar ratio of formaldehyde to phenol are in the range of 2.0:1 to 2.5:1 in the highly condensed resin of step (a); 1.8:1 to 2.3:1 in the non-resinous condensate of step (c) and 1.7:1 to 2.4:1 in the resulting liquid phenolic resin binder composition.

6. The method of claim 1 further including the step of adding a formaldehyde scavenger compound selected from the group consisting of ammonium hydroxide, resorcinol, 3,5-xylenol, 3-cresol, urea and sulfites to the resin composition at the end of the resin cooking in step (c) to reduce residual formaldehyde.

7. The method of claim 3 wherein the resin composition comprises 40-60% by weight of the highly condensed and cross-linkable phenol formaldehyde resin and 60-40% by weight of the non-resinous phenol-formaldehyde condensates.

8. The method of claim 7 wherein the liquid resin composition comprises 35-70% resin solids in an aqueous medium.

9. A liquid phenolic resin binder composition having a viscosity and surface tension which is sufficiently low to allow spray atomization as a find droplet; a free formaldehyde content of 0-4% by weight and which is characterized by being pre-cure resistant when applied to waferboard under conventional waferboard manufacturing conditions which is prepared by the method of claim 1.

10. The liquid phenolic resin of claim 9 wherein the non-resinous phenol-formaldehyde condensate consists essentially of mono, di and tri-methylol phenols and methylolated di and tri-nuclear phenols.

11. The composition of claim 9 wherein the molar ratio of formaldehyde to phenol are in the range of 1:1 to 3:1 for highly condensed resin; 1.5:1 to 3:1 for the non-resinous condensate and 1.5:1 to 2.6:1 for the resulting overall resin binder composition.

12. The composition of claim 11 wherein the molar ratio of formaldehyde to phenol are in the range of 2.0:1 to 2.5:1 for the highly condensed resin; 1.8:1 to 2.3:1 for the non-resinous condensate, and 1.7:1 to 2.4:1 for the resulting overall resin binder composition.

13. The composition of claim 9 wherein the liquid resin composition comprises 35-70% by weight of resin solids in an aqueous solution.

14. The composition of claim 13 wherein the resin solids are present in an amount of 50-60% by weight of the composition.

15. The composition of claim 9 wherein the liquid phenolic resin composition comprises 40-60% by weight of the highly condensed resin and 60-40% by weight of the non-resin condensate.

* * * * *